Sept. 24, 1968     SHO NARITA ET AL     3,403,378

CHARACTER SENSING BY PULSE CODE ANALYSIS

Filed May 27, 1964

INVENTOR.
Sho Narita
Shinji Yamamoto

BY

Western & Western

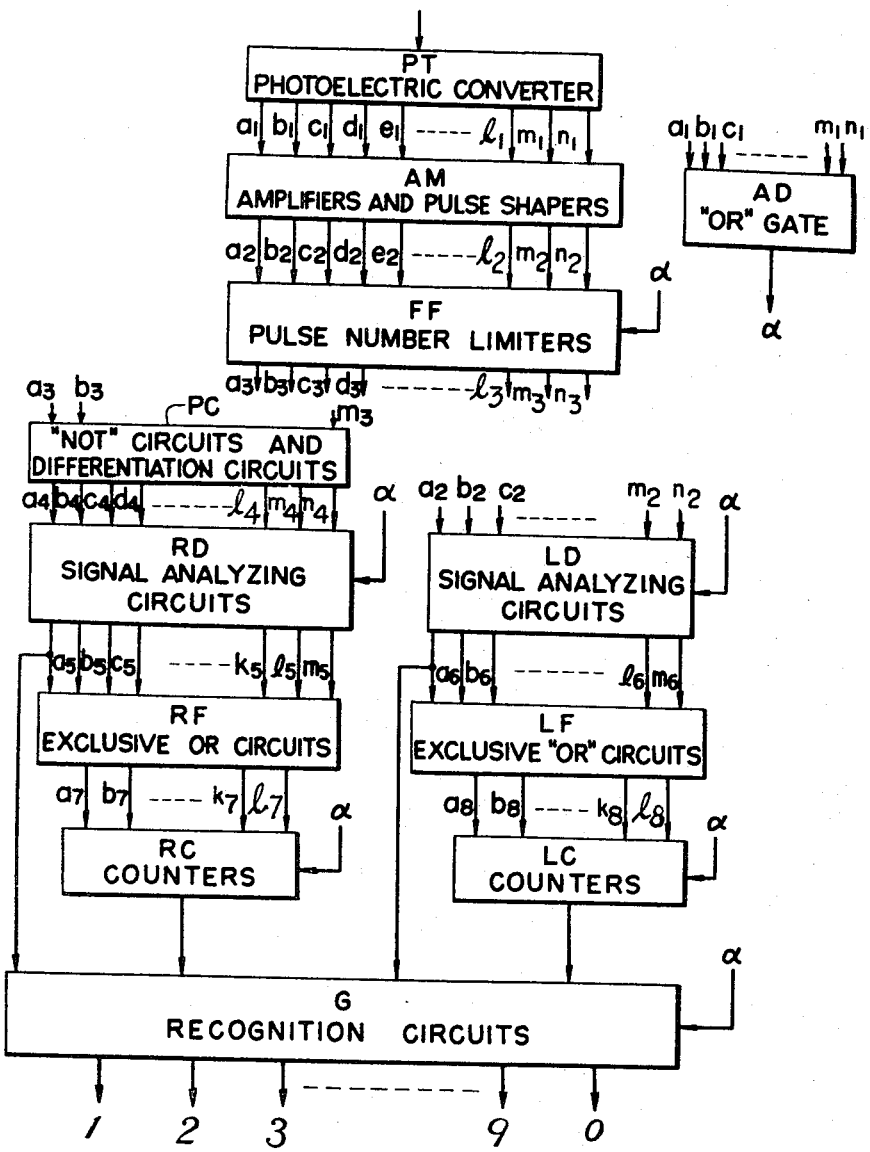

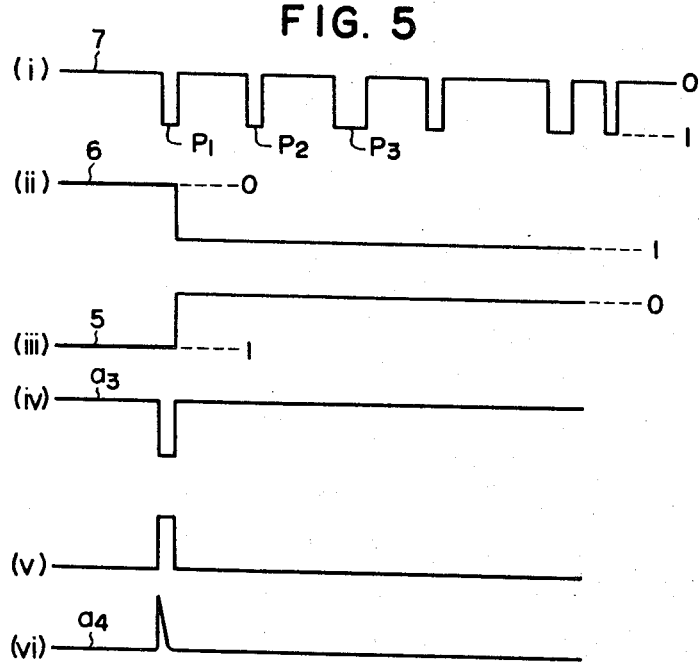
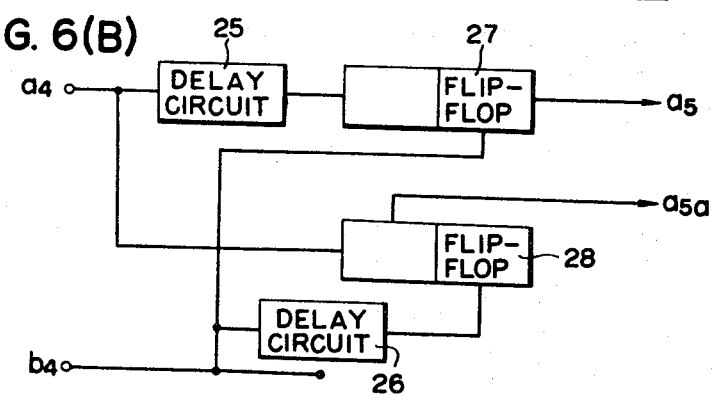
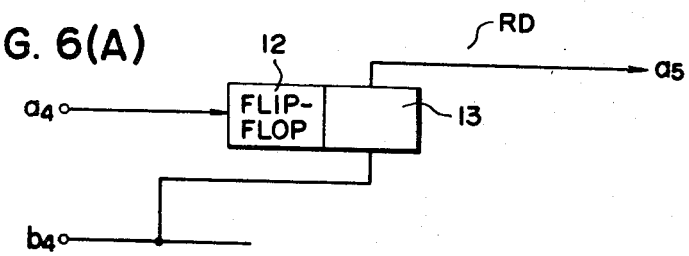

FIG. 7(A)
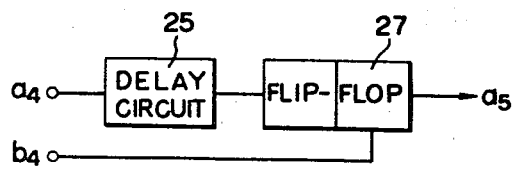
FIG. 7(B)
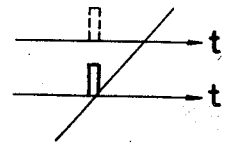
FIG. 7(C)
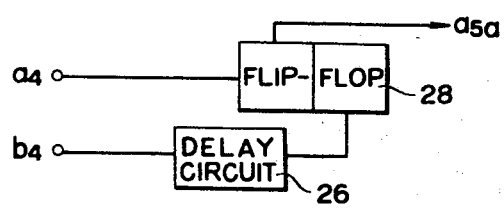
FIG. 7(D)
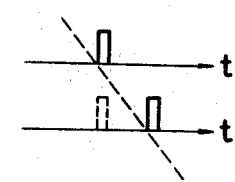
FIG. 8(A)
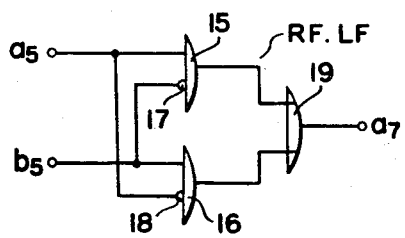
FIG. 8(B)
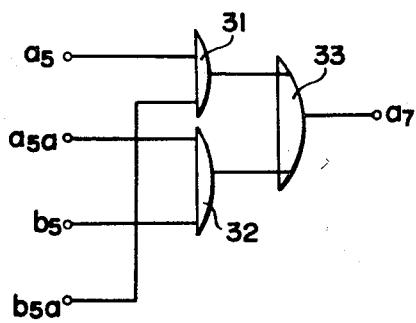
FIG. 9
|   | $a_5\ b_5$ ---- | $a_6\ b_6$ ---- |
|---|---|---|
| 1 | 0 | 0 |
| 2 | 010 | 10 |
| 3 | 0101010 | 1010 |
| 4 | 01 | 01 |
| 5 | 101 | 10 |
| 6 | 01 | 010 |
| 7 | 10 | 10 |
| 8 | 0101 | 1010 |
| 9 | 010 | 10 |
| 0 | 01 | 10 |
INVENTOR.
Sho Narita
Shinji Yamamoto
BY
Western & Western INVENTOR.
Sho Narita
Shinji Yamamoto
BY
Western & Western

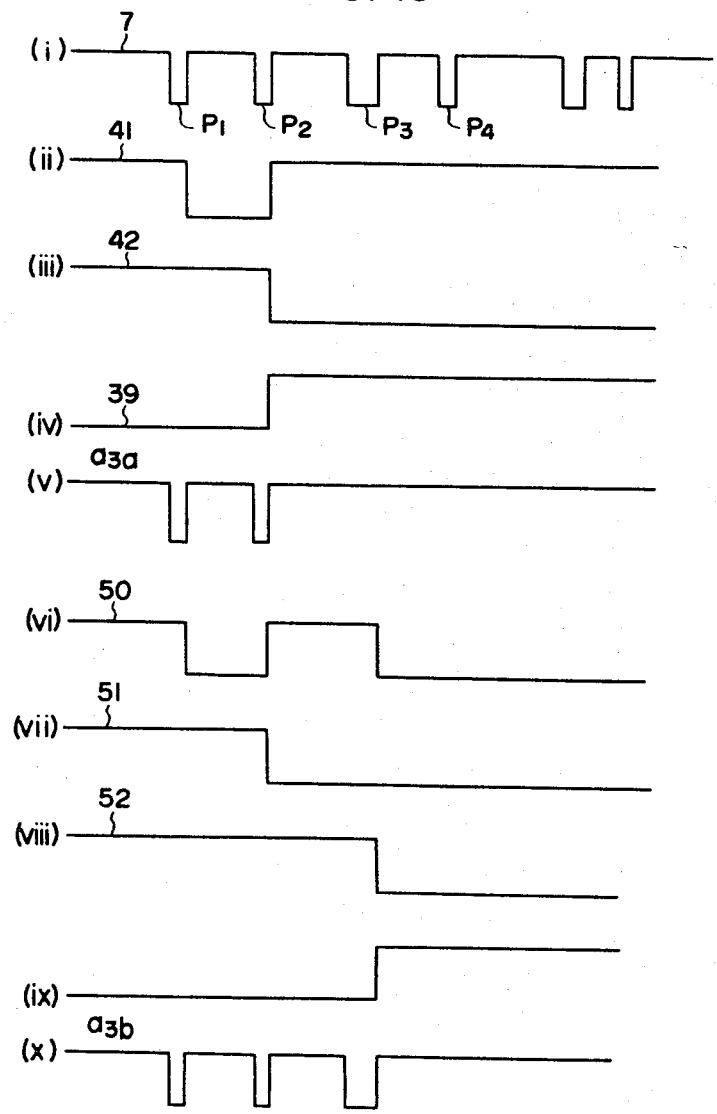

FIG. 14(A)
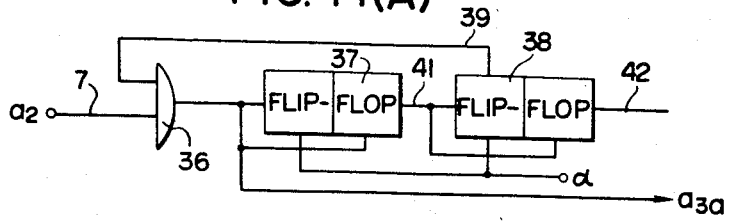
FIG. 14(B)
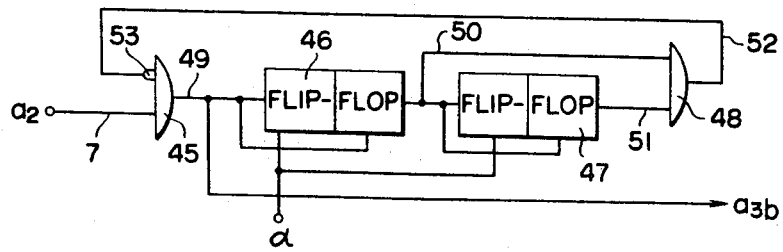
FIG. 16(A)
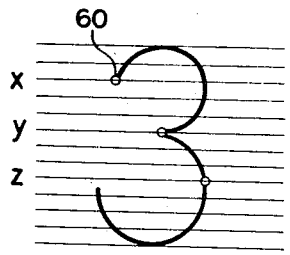
FIG. 16(B)
| | COMPARISON | | CENTER |
|---|---|---|---|
| | x | y | z |
| CORD SERIES | 0 | 1 | 1 |
| | (x) | 0 | (z) |
| | 0 | (y) | 1 |
| | 1 | 0 | |
| | 0 | 1 | |
FIG. 17
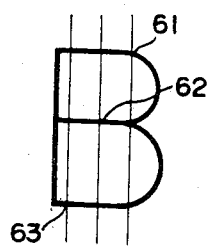

United States Patent Office 3,403,378
Patented Sept. 24, 1968

3,403,378
CHARACTER SENSING BY PULSE
CODE ANALYSIS
Sho Narita, Kodaira-shi, and Shinji Yamamoto, Kokubunji-machi, Tokyo-to, Japan, assignors to Kabushiki Kaisha Hitachi Seisakusho, Tokyo-to, Japan, a joint-stock company of Japan
Filed May 27, 1964, Ser. No. 370,532
Claims priority, application Japan, May 30, 1963, 38/27,665
7 Claims. (Cl. 340—146.3)

ABSTRACT OF THE DISCLOSURE

Means for the detection and encoding of time relationships of a predetermined number of pulses in a form sensing system wherein a form to be recognized is scanned. A plurality of scanning lines is scanned, and electrical pulse signals are generated when the lines intersect. The means detect advanced and retarded time relationships between the instant at which a predetermined number of pulses is generated in different scanning lines and permit the encoding thereof. Thus a code series is obtained by which the form is recognized.

---

This invention relates to means for sensing recorded forms such as characters. More particularly, the invention relates to a new system for sensing forms wherein: a form to be sensed is scanned by a large number of scan lines so as to cause electrical signals to be generated when the scan lines cross parts of the form; these signals are compared with electrical signals produced from other scan lines and are encoded in accordance with the relative retarded or advanced timing of the generation of these signals; and recognition of the form is accomplished from the combination of the code so obtained.

The nature, principle, and details of the invention, as well as the objects and advantages thereof, will be best understood by reference to the following detailed description with respect to preferred embodiments of the invention, when taken in conjunction with the accompanying drawings in which like parts are designated by like reference characters, and in which.

Figure 2A:
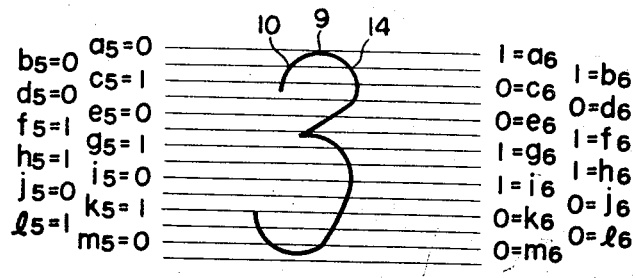
FIG. 2(A) is a planar view to be referred to in a description of signals detected by various phototransistors in the case when the arabic numeral 3 is to be read.
Figure 2B:
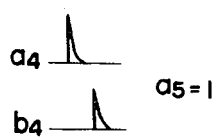
Figure 2C:
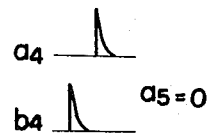
Figure 4:
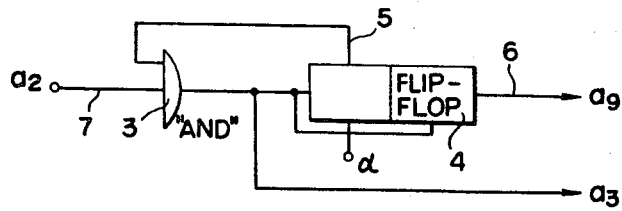
Figure 12:
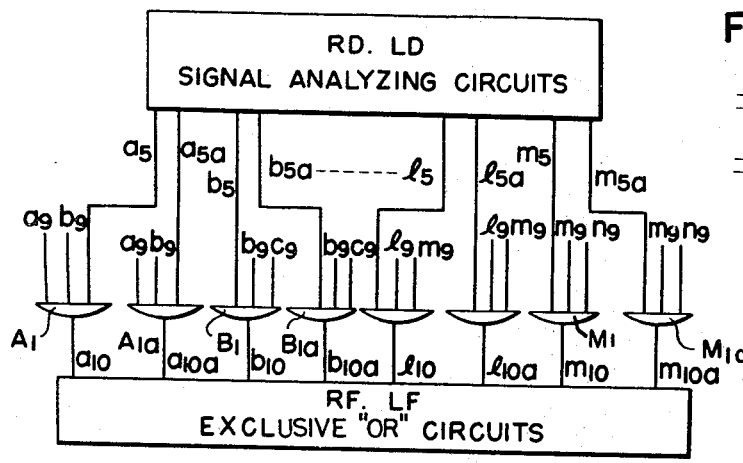
Figure 11:
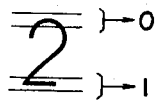
Figure 13:
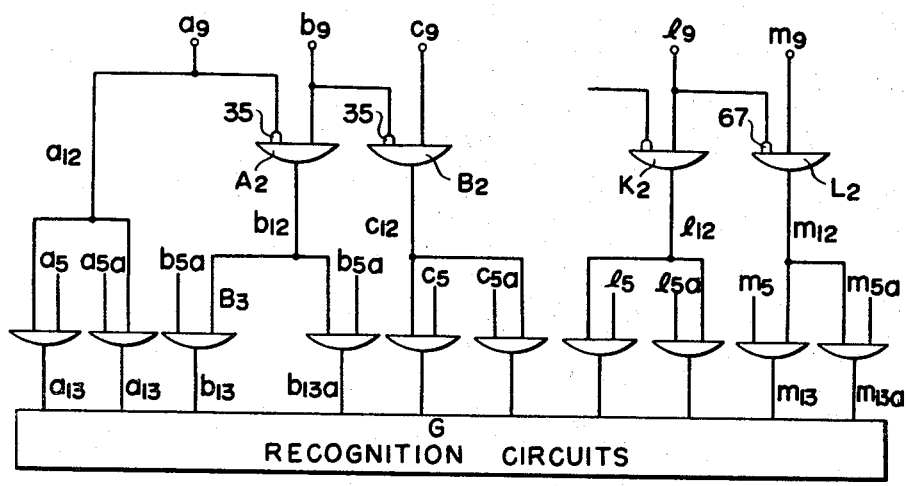
Figure 10:
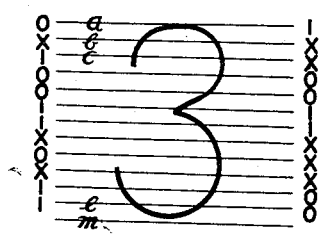

FIGS. 2(B) and 2(C) are pulse waveform diagrams indicating the encoding of the signals detected as indicated in FIG. 2(A);

FIG. 3 is a block diagram showing the general arrangement and composition of a recognition circuit constituting the principal part of the system according to the invention;

FIG. 4 is a block diagram showing one unit of the pulse number limiters FF shown in FIG. 3;

FIG. 5 is a pulse time chart indicating various output signals in the unit circuit shown in FIG. 4;

FIG. 6(A) is a block diagram showing the details of one unit of the analyzing circuit groups RD and LD shown in FIG. 3;

FIG. 6(B) is a block diagram showing another embodiment of the above unit according to the invention;

FIGS. 7(A), 7(B), 7(C), and 7(D) are block diagrams and pulse time charts to be referred to in an analysis of the unit circuit shown in FIG. 6(B);

FIG. 8(A) is a schematic diagram showing the details of one unit of an exclusive "OR" circuit group;

FIG. 8(B) is a schematic diagram of another embodiment according to the invention of the above mentioned unit;

FIG. 9 is a tabular representation showing an encoding table of signals corresponding respectively to the arabic numerals;

FIG. 10 is a planar view indicating the manner in which the arabic numeral 3 is detected in another embodiment of the invention;

FIG. 11 is planar view indicating scanning lines outwardly adjacent to scanning lines scanning the extremities of a character to be read;

FIG. 12 is a block diagram of a circuit operating to transform signals from scanning lines which do not scan the character shown in FIG. 11 into X signals;

FIG. 13 is a block diagram of a circuit which detects the signal of a scanning line scanning the upper extremity of a character;

FIGS. 14(A) and 14(B) are block diagrams showing other embodiments according to the invention of the pulse number limiter FF shown in FIG. 3;

FIG. 15 is a pulse time chart indicating the operations of the unit circuits shown in FIG. 14;

FIG. 16(A) is a planar view indicating the intersecting of the arabic numeral 3 and scanning lines in another embodiment of the invention;

FIG. 16(B) is a tabular representation indicating an example of encoding for the scanning shown in FIG. 16(A); and FIG. 17 is a planar view indicating the manner in which signals detecting the character B are obtained in another embodiment of the invention.

The accompanying drawings relate, principally, to the application of the present invention to sensing (reading) of arabic numbers with the use of phototransistors as photoelectric converters, said application being presented as merely one example for illustrative purposes.

Figure 1:
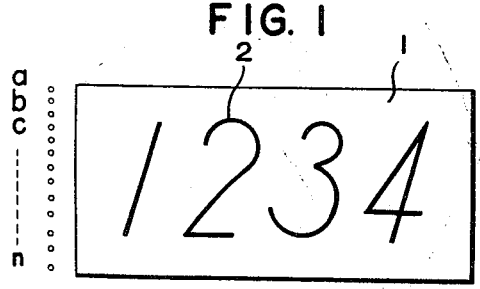
FIG. 1 is a planar view showing a card on which there are recorded characters to be read and indicating a combination of phototransistors to convert the character images into electrical signals.

Referring first to FIG. 1, there is shown therein a card 1 bearing several numerals 2 to be read inscribed horizontally thereon. This card 1 is fed leftwardly as viewed in FIG. 1 along a path on which there is provided a group of phototransistors $a, b, c \ldots n$ for detecting the said numerals. Although, for convenience in description, the number of phototransistors in this group is here taken to be fourteen, this number, in general, may be any number selected to suit the number and kind of characters to be recognized.

Referring now to FIG. 3 showing the general arrangement and composition of the entire form sensing circuit according to the invention the reference character PT designates a photoelectric converter for numerals, said converter including the above mentioned group of phototransistors $a, b \ldots$.

Output signals $a_1, b_1 \ldots$ leaving the various phototransistors $a, b \ldots$ of this photoelectric converter PT are introduced into a group of amplifiers and pulse shaping circuits AM, where said signals are pulse shaped and amplified into signals $a_2, b_2 \ldots$ having a number of pulses $P_1, P_2 \ldots$ as indicated in FIG. 5($i$). These signals $a_2, b_2 \ldots$ are introduced into a group of pulse number limiters FF and become signals $a_3, b_3 \ldots$. The signal transformation in this group of pulse number limiters FF will now be described in detail hereinbelow.

Referring to FIG. 4 showing one unit circuit of this group FF, a signal $a_2$, for example, enters an "AND" gate 3 and then enters a flip-flop circuit 4. One output part 5 of the output of this flip-flop circuit 4 is fed back to the "AND" gate 3.

It will be assumed that the signal $a_2$ here has several pulses $P_1, P_2 \ldots$ as in the signal 7 indicated in FIG. 5. It will be further assumed that the flip-flop 4 is reset beforehand by a signal $\alpha$ sent out from an "OR" gate AD shown in FIG. 3, and the sides 6 and 5 indicated in FIG. 4 maintain the states of "0" signal and "1" signal, respectively. Then, upon the arrival of a pulse $P_1$ as indicated in FIG. 5($i$), the flip-flop 4 will change its state, and the waveforms on the sides 6 and 5 will become those indicated respectively in FIGS. 5($ii$) and ($iii$). Since this waveform of FIG. 5($iii$) and the input signal waveform 7 enters the "AND" gate 3 shown in FIG. 4, the pulses $P_2$, $P_3$ . . . from the second pulse and thereafter of the signal 7 disappear, and only one pulse as indicated in FIG. 5($iv$) remains in the output signal $a_3$. The signal $a_3$ obtained in this manner is introduced into a group of "NOT" circuits and differentiation circuits PC, where its waveform is inverted in FIG. 5($v$) by a "NOT" circuit, and the signal is differentiated in a differentiation circuit. Then the minus pulse of this signal is clipped and eliminated, whereupon a signal $a_4$ as shown in FIG. 5($vi$) is obtained.

The signals $a_4$, $b_4$ . . . obtained in this manner are introduced as input into a group of signal analyzing circuits RD of the left side (as viewed in FIG. 3) to become signals $a_5$, $b_5$. . . . This signal analyzing circuit group RD of the left side compares the aforesaid signals $a_4$, $b_4$ . . . respectively with their adjacent signals and produces a "1" signal when the timings of their pulses are advanced and a "0" signal when said timings are retarded.

Referring to FIG. 6(A) showing one unit of the signal analyzing circuit group RD of the left side, the signal $a_4$ and its adjacent signal $b_4$ enter as inputs respectively into one part and the other input part 13 of a flip-flop circuit 12. The signal $a_5$ is obtained from the part where a "1" signal leaves as output when the timing of the pulse of the signal $a_4$ is advanced relative to the timing of the pulse of the signal $b_4$.

When, as indicated in detail in FIGS. 2(B) and 2(C), the timing of the first pulse generation of the signal $a_4$ is advanced relative to the timing of the first pulse generation of the signal $b_4$, the signal $a_5$ becomes "1," and when, conversely, the timing of the pulse generation of the first pulse of the signal $a_4$ is retarded relative to the timing of the first pulse generation of the signal $b_4$, the signal $a_5$ becomes "0." Similarly, the signal $b_4$ is compared with signal $c_4$ to produce a signal $b_5$; the signal $c_4$ is compared with signal $d_4$ to produce a signal $c_5$; and, thereafter, each signal is similarly compared with its successively adjacent signal, whereby signals $d_5$, $e_5$ . . . are generated.

The lefthand side of FIG. 2(A) indicates the left side signals $a_5$, $b_5$ . . . in the case when the arabic numeral "3" is to be read. Since the point 9 at which the scanning line of the phototransistor $a$ first intersects the numeral is to the right (to the rear) of the point 10 at which the scanning line of the phototransistor $b$ first intersects the numeral, the signal $a_5$ becomes "0," and the signals $b_5$, $d_5$, $e_5$, $i_5$, $j_5$, and $m_5$, therebelow with the same relationship, becomes "0." Inversely, the signals $c_5$, $f_5$, $g_5$, $h_5$, $k_5$, and $l_5$ generated in the case when the points at which their corresponding scanning lines first intersect the numeral are to the left (to the front) of the points at which the respective scanning lines downwardly adjacent to said scanning lines first intersect the numeral become "1."

Referring again to FIG. 3, the aforementioned signals $a_2$, $b_2$ . . . enter as input into a group of signal analyzing circuits LD of the right side to become signals $a_6$, $b_6$ . . . . These circuits LD compare the signals $a_2$, $b_2$ . . . with their respectively adjacent signals and generate a "1" signal when the timing of generation of their final pulses (in each case, the second pulse when there are two pulses, and the first when there is one pulse) is advanced and a "0" signal when said timing is retarded. This group of signal analyzing circuits LD of the right side is exactly the same as that above described group of signal analyzing circuits RD of the left side, and, because of the nature of flip-flop circuits the timings of the final pulses of the signals $a_2$ and $b_2$ are compared.

More specifically, when the timing of the final pulse of the signal $a_2$ is advanced relative to the timing of the final pulse of the signal $b_2$, the signal $a_6$ becomes "1" and, inversely, when it is retarded, the signal $a_6$ becomes "0." The signal $b_2$ is similarly compared with the signal $c_2$, and a signal $b_6$ is generated. Similarly, each of the other signals thereafter are compared with the signal successively adjacent thereto, and signals $c_6$, $d_5$ . . . are generated.

The righthand side of FIG. 2(A) indicates the right side signals $a_6$, $b_6$ . . . in the case when the arabic numeral "3" is to be read. Since the point 9 at which the scanning line of the phototransistor $a$ finally intersects the numeral is to the left (to the front) of the point 14 at which the scanning line of the transistor $b$ finally intersects the numeral, the signal $a_6$ becomes "1." The signals $b_6$, $f_6$, $g_6$, $h_6$, and $i_6$, which have similar relationships, become "1." Inversely, the signals $c_6$, $d_6$, $e_6$, $j_6$, $k_6$, $l_6$, and $m_6$ generated in the case when the points at which their corresponding scanning lines finally intersect the numeral are to the right (to the rear) of the points at which the respective scanning lines downwardly adjacent to said scanning lines finally intersect the numeral become "0."

A signal $\alpha$ is sent from the "OR" gate AD, shown in FIG. 3, to the signal analyzing circuits RD of the left side and to the signal analyzing circuits LD of the right side to verify the instants at which the reading of one numeral is started and completed, and the flip-flop 4 in each unit is constantly maintained in a correct state during the reading of a numeral.

The series of signals $a_5$, $b_5$ . . . and $a_6$, $b_6$ . . . corresponding to the numerals zero to 9 sent out from the signal analyzing circuits RD and LD are indicated in FIG. 9. In this figure, when two or more adjoining signals have the same value "0" or "1," these signals are indicated in abbreviated form. That is, as shown in FIG. 2(A), the series of signals $a_5$, $b_5$ . . . should be indicated as "0010011100110," but in FIG. 9 is abbreviated to "0101010" for simplification of the indication.

These series of signals $a_5$, $b_5$ . . . and signals $a_6$, $b_6$ . . . are introduced as input respectively into exclusive "OR" circuits RF and LF as shown in FIG. 3 and respectively transformed into signals $a_7$, $b_7$ . . . and signals $a_8$, $b_8$. . . .

One unit of these exclusive "OR" circuits RF and LF is shown in detail in FIG. 8(A). Each of the adjacent signals $a_5$ and $b_5$ (selected here as examples) is introduced into an "AND" gate together with a signal resulting from the inhibition of the other adjacent signal, and the resulting signals are introduced into an "OR" gate. In FIG. 8(A), these "AND" gates are designated by reference numerals 15 and 16 provided respectively with "NOT" circuits 17 and 18 for inhibition, and the aforesaid "OR" gate is designated by reference numeral 19.

In the exclusive "OR" circuits RF and LF, in the cases when adjacent signals among the series of signals $a_5$, $b_5$ . . . and $a_6$, $b_6$ . . . are the same, the output signals become "0," and in the cases when different signals are adjacent, the output signals become "1." That is, by these circuits, "1" signals are generated from the parts of the signals $a_5$, $b_5$ . . . and signals $a_6$, $b_6$ . . . wherein signals change from "0" to "1" or from "1" to "0," and "0" signals are generated from the parts wherein "1" signals or "0" signals are consecutively in a row.

Referring again to FIG. 3, the signals $a_7$, $b_7$ . . . and signals $a_8$, $b_8$ . . . leaving as output from the exclusive "OR" circuits RF and LF are respectively introduced as input into counters RC and LC which count only the "1" signals thereof. Consequently, the number of parts in the signals $a_5$, $b_5$ . . . and signals $a_6$, $b_6$ . . . in which signals change from "0" to "1" or, inversely, from "1" to "0" is counted by these circuits RC and LC.

In this manner, each numeral read as described above is represented by a combination of two numbers, which are introduced as input into a recognition circuit G, where the read numeral is identified, and a signal corresponding thereto is recomposed and sent out. A signal α is sent from the aforementioned "OR" gate AD also to the recognition circuit G and the counters RC and LC to verify the start and completion of reading of one numeral.

In the system as described above, the pulse signals of each pair of adjacent transistors are compared, and, depending on the retarded or advanced relationship of the timings of their pulse generations, a "1" or "0" is generated. However, when there is no large difference in said timings, there is the undesirable possibility of reversal of the manner in which the signals are sent out, depending on the manner in which the character being read has been inscribed, and the possibility of erroneous operation.

The present invention, in another aspect thereof, contemplates the elimination of the above described disadvantage by providing a method and means whereby, as indicated in FIG. 10, an "X" signal is generated when there is no great difference between the relative front and rear positions of intersection of each pair of adjacent scanning lines, and this signal is neglected.

For this purpose, circuits, each unit of which is as shown in FIG. 6(B), are used in the left side and right side groups of signal analyzing circuits RD and LD, and circuits, each unit of which is as shown in FIG. 8(B) are used in the exclusive "OR" circuit groups RF and LF. These circuit units will now be described in detail hereinbelow.

Referring to FIG. 6(B), the unit signal analyzing circuit shown therein essentially comprises delay circuits 25 and 26 and flip-flop circuits 27 and 28. This circuit is further shown by a disassembled representation in FIG. 7. As indicated in FIGS. 6(B) and 7, in the flip-flop 27, the signal $a_4$ after passing through the delay circuit 25 is compared with the signal $b_4$, while, in the flip-flop 28, the signal $a_4$ is compared with the signal $b_4$ which has passed through the delay circuit 26. Accordingly, if the timing of pulse generation of the signal $a_4$ is advanced relative to the timing of pulse generation of the signal $b_4$ by a time interval greater than a delay time $\tau$ determined by the delay circuits, the output signal $a_5$ of the flip-flop 27 will become "1," and the output signal $a_{5a}$ of the flip-flop 28 will become "0." Conversely, if the timing of pulse generation of the signal $a_4$ is retarded by a time interval greater than $\tau$, the output signal $a_5$ will become "0," and the output signal $a_{5a}$ will become "1." If there is no great difference between the timings of pulse generation of the two signals $a_4$ and $b_4$, the output signals $a_5$ and $a_{5a}$ will both become "0."

Therefore, by establishing a code system whereby the resulting signal is:

a "1" signal when $a_5=1$, $a_{5a}=0$;
a "0" signal when $a_5=0$, $a_{5a}=1$;

and an "X" signal when $a_5=0$, $a_{5a}=0$, the left side signals received from the scanning lines of the transistors $a_1, b_1 \ldots$ are encoded as indicated on the lefthand side of FIG. 10, and the right side signals are encoded as indicated on the righthand side of FIG. 10.

The series of signals $a_5, a_{5a}, b_5, b_{5a} \ldots$ and $a_6, a_{6a}, b_6, b_{6a} \ldots$ are introduced as input into exclusive "OR" circuits RF and LF composed of unit circuits each as shown in FIG. 8(B), whereby signals $a_7, b_7 \ldots$ are produced.

As indicated in FIG. 8(B), each signal is introduced, together with an adjacent signal bearing the subscript "a," into an "AND" gate, and the resulting outputs are introduced into an "OR" gate. For this purpose, the unit circuit shown comprises "AND" gates 31 and 32 for signals $a_5$ and $b_{5a}$ and signals $b_5$ and $a_{5a}$, respectively, and an "OR" gate 33.

In this circuit, "X" signals are neglected (that is, treated as being non-existent). Accordingly, in the case when adjacent signals, excluding said "X" signals, are the same, the output signals become "0," and in the case when different signals are adjacent, the output signals become "1."

In the above described manner, output signals $a_7, b_7 \ldots$ and $a_8, b_8 \ldots$ which are identical to those obtained in the manner described hereinafter, are obtained and, similarly as before, are sent to the counters RC and LC and thence to the recognition circuit G, where the read numeral is identified.

A further problem arises in the case wherein, as illustrated in FIG. 11, the signal of a scanning line which scans an extremity of a character and the signal of the outwardly adjacent scanning line are compared. In this case, in spite of the fact that the signals are meaningless, either a "0" or "1" signal is obtained, and there is the possibility of erroneous recognition of the character.

The present invention, in still another aspect thereof, contemplates the elimination of this difficulty by the use of an arrangement of means as shown in FIG. 12 whereby, in all cases of comparison with signals with no pulse, "X" signals to be neglected are produced.

As indicated in FIG. 12, the signals $a_5, a_{5a}, b_5, b_{5a} \ldots$ and $a_6, a_{6a}, b_6, b_{6a} \ldots$ leaving the signal analyzing circuits RD and LD are introduced as input, together with signals $a_9, b_9 \ldots$ corresponding to the signal $a_9$ shown in FIG. 4 and adjacent signals $b_9, c_9 \ldots$ into "AND" gates $A_1, A_{1a}, B_1, B_{1a} \ldots M_1, M_{1a}$. That is, signals $a_5, a_{5a}$ are each subjected to logical "AND" operation with signals $a_9$ and $b_9$, and signals $b_5$ and $b_{5a}$ are each subjected to logical "AND" operation with signal $b_9$ and $c_9$.

If, in the circuit of FIG. 4 in this case, the number of pulses in each of the signals $a_2, b_2 \ldots$ is greater than one, the resulting signals $a_9, b_9 \ldots$ will become "1" signals each with one pulse. However, when a scanning line does not intersect the character, and there is no pulse, the resulting output signal remains as a "0" signal.

Accordingly, of the signals $a_{10}, a_{10a}, b_{10}, b_{10a} \ldots$ obtained, those corresponding to the extremities of the character and to regions outside of the character all become "0" and, as described in connection with FIG. 6(B), $a_{10}=a_{10a}=0$. That is, such signals become "X" signals and are neglected.

The signals $a_{10}, a_{10a}, b_{10}, b_{10a} \ldots$ and $a_{11}, a_{11a}, b_{11}, b_{11a} \ldots$ so obtained are then introduced as input into the exclusive "OR" circuits RF and LF in place of the signals $a_5, a_{5a}, b_5, b_{5a} \ldots$ and $a_6, a_{6a}, b_6, b_{6a} \ldots$ Although not shown, the signals $a_{11}, a_{11a}, b_{11}, b_{11a} \ldots$ are signals obtained by subjecting the signals $a_6, a_{6a}, b_6, b_{6a} \ldots$ to logical "AND" operation with signals $a_9, b_9 \ldots$ similarly as in the case of the aforementioned signals $a_5, a_{6a}, b_5, b_{5a} \ldots$ By the above described operation, the signals $a_{10}, a_{10a}, b_{10}, b_{10a} \ldots$ and $a_{11}, a_{11a}, b_{11}, b_{11a} \ldots$ corresponding to scanning lines compared with signals obtained from scanning lines which do not intersect the character being read become "X" signals of "0, 0" code. Consequently, these signals are neglected in the following exclusive "OR" circuits RF and IF and have no effect on the recognition.

As described hereinbefore, the number of instances wherein signals change from "0" to "1" or from "1" to "0" is detected in the exclusive "OR" circuits RF and LF. Consequently, depending on whether the initial signal is "0" or is "1," the number of changes even with different signals becomes the same in some cases, whereby there arises the undesirable possibility of erroneous recognition of the character read.

The present invention, in a further aspect thereof, contemplates overcoming the above mentioned difficulty through the use of an arrangement of means as shown in FIG. 13, whereby the signal obtained from the scanning line which scans the uppermost part of the character being read is sent to the recognition circuit G to be used as a reference in the recognition of the character. More specifically, inhibited signals resulting from the inhibition of the aforementioned signals $a_9, b_9 \ldots$ respectively by "NOT" circuits 35, 35 $\ldots$ are introduced, together with respectively adjacent signals, into "AND"

gates $A_2$, $B_2$ ... and the resulting signals $a_{12}$, $b_{12}$ ... are introduced, together with corresponding signals $a_5$, $a_{5a}$, $b_5$, $b_{5a}$ ... into "AND" gates $A_3$, $A_{3a}$, $B_3$, $B_{3a}$ ...

In these circuits, of the signals $a_9$, $b_9$ ... those corresponding to scanning lines which do not intersect the character are "0" signals, and those corresponding to scanning lines which intersect the character are "1" signals. Consequently, when inhibited signals thereof are subjected to logical "AND" operation with adjacent signals, the signals successively adjacent to "1" signals all become "0" signals, and those which are "0" signals themselves also become "0" signals. Therefore, only in the case when a "1" signal is adjacent to a "0" signal, the resulting signal becomes a "1" signal.

That is, of the signals $a_{12}$, $b_{12}$ ... only the signals corresponding to scanning lines which scan the upper extremity of the character become "1" signals, and the remainder all become "0" signals. When these signals are subjected to logical "AND" operation with signals $a_5$, $a_{5a}$, $b_5$, $b_{5a}$ ... only those which have been transformed into "1" signals remain, and the rest all become "X" signals and are neglected. The signals of the scanning lines of the extremities of the character are identified by these signals so obtained, whereby accurate recognition of the character is possible.

In the above described embodiment of the invention, there is a case in which only one pulse from among the pulses produced in the scanning lines is taken out, that is, when the left side signals and all of the pulses are admitted, that is, three or four pulses are generated in one scanning line of one character such as the capital letter W or M upon carrying out the operation with the right side signals divided into two parts. Accordingly, the method and system of the invention is readily applicable also to such a case. The present invention is not only applicable to merely two kinds of signal detection for each of the lefthand and righthand sides, but also makes possible the recognition of an extremely large number of kinds of characters by a comparison of only the first pulse, that is, the left side signals up to the instant under consideration, next a comparison method admitting pulses up to and including the second pulse, then a comparison method admitting pulses up to and including the third pulses, continuation of this procedure in a similar manner, and finally a comparison method admitting all pulses, that is, effecting division into various cases of those corresponding to the right side signals, carrying out encoding in each case, and coupling these signals. The manner in which a system apparatus suitable for such cases may be arranged will now be described hereinbelow.

When unit circuits each as shown in FIG. 4 are used for the pulse number limiters FF as shown in FIG. 3, left side signals are generated and, passing through "NOT" circuits and differentiation circuits PC, are introduced into the signal analyzing circuits RD. The signals which, without passing through the pulse number limiters FF, enter directly the signal analyzing circuits LD have been described as the right side signals. By extending branches from the signals $a_2$, $b_2$, $c_2$ ... and using the circuits shown in FIGS. 14(A) and 14(B) in place of the circuit shown in FIG. 4 as units of the pulse number limiters FF, it is possible to limit the number of input pulses to those up to and including the second pulse and to those up to and including the third pulse. The unit circuits shown in FIG. 14 will now be described in detail hereinbelow.

The circuit shown in FIG. 14(A) is a unit circuit for limiting input pulses to those up to and including the second pulse. The signal $a_2$ passes through an "AND" gate 36, enters a flip-flop 37, and then enters a flip-flop 38. The signal 39 from one side of this flip-flop 38 is introduced as input into the "AND" gate 36 and is subjected to logical "AND" operation together with the signal $a_2$. The pulse waveforms at various parts of this circuit are shown in FIG. 15.

When a pulse train having pulses $p_1$, $p_2$ ... enters as the input signal, the output 41 of the flip-flop 37 assumes the form of FIG. 15 (ii). Similarly, the outputs 42 and 39 of the flip-flop 38 assume the forms of FIG. 15(iii) and (iv), respectively. The introduction of the signal 39 as input into the "AND" gate 36 causes the signal $a_{3a}$ to assume the form of FIG. 15(v), and the signal part of pulse $p_3$ and thereafter disappears.

The circuit shown in FIG. 14(B) is a unit circuit for limiting input pulses to those up to and including the third pulse. The input signal $a_2$ passes through an "AND" gate 45, enters a flip-flop 46, and then enters a flip-flop 47. The outputs 50 and 51 of these flip-flops 46 and 47 are introduced as input into an "AND" gate 48, the output 52 of which, after being inhibited by an inhibiting device 53, is introduced as input into the "AND" gate 45. The pulse waveforms at various parts of this circuit are shown in FIG. 15 (vi) through (x).

When a signal 7 as indicated in FIG. 15(i) enters as the input $a_2$, the output 50 of the flip-flop 46 assumes the waveform of FIG. 15(vi), and the output 51 of the flip-flop 47 assumes the form of FIG. 15(vii). The output 52 resulting from the logical "AND" operation on waveforms (vi) and (vii) assumes the waveform of FIG. 15(viii). This signal 52 is inhibited by the inhibiting device 53 of the "AND" gate 45 and assumes the waveform of FIG. 15(ix), and since this signal is subjected to logical "AND" operation with the input 7, a waveform with only three pulses remaining therein as shown in FIG. 15(x) is obtained as the output signal $a_{3b}$.

After the input waveforms have been limited to pulse numbers up to and including second or third pulses by the above described circuits, an encoding series for the case when pulses up to and including the second pulse are admitted and an encoding series for the case when pulses up to and including the third pulse are admitted are obtained by arranging the circuits corresponding respectively to circuits PC, RD, RF, and RC in FIG. 3 in respectively independent states. Then, by combining the left side and right side signals of FIG. 3, recognition can be carried out. In this manner, it is possible to extend the range of recognizable images to an extremely wide variety of characters. Furthermore, by the same technique it is readily possible to extend the pulses limited in ordinary characters to four pulses or more.

While in the above described example of the invention, each signal is compared with an adjacent signal, the present invention is not limited to such practice. For example, the signals of scanning lines separated by one scanning line interposed therebetween may be compared. Alternatively, by a method which comprises fixing one point $a$ and comparing this signal with signals produced by other scanning lines, that is, effecting comparison of $a$ with $b$, $a$ with $c$, $a$ with $d$, and so forth, next comparing signal $b$ with other signals, and repeating this procedure in the case of the other signals, it is possible to accomplish encoding in a practical and effective manner. One example of this method is indicated in FIG. 16.

FIG. 16(A) shows the numeral "3," its scanning lines, and points $x$, $y$, and $z$ to become comparison centers. The method of encoding in the case when, with respect to the retarded or advanced states of signals produced by the scanning lines as viewed from the points $x$, $y$, and $z$, only the first pulses are considered, that is, an encoding example with respect to the left side signals, with the same signals combined into one signal, as indicated in FIG. 16(B). This encoding method can be readily understood by analogical inference from the foregoing disclosure. For example, with respect to $x$, a "0" signal is caused to correspond to pulses generated later than pulse 60 (shown in FIG. 16(A)) produced by the scanning line $x$, and a "1" signal is caused to correspond to pulses generated earlier than pulse 60.

The present invention can be adapted for application to vertical scanning such as that of the alphabetical character "B" as shown in FIG. 17. In this case, the operational method, as described hereinbefore with respect to an example, of detecting the relative timing with respect to the first pulse, then detecting the relative timing with respect to the pulses up to and including the second pulse, and finally detecting the relative timing with respect to the pulses up to and including the third pulse is not effective, the reason being that, since the timings of pulse generations are substantially the same, distinctive features cannot be obtained.

Accordingly, the method resorted to in the aforedescribed example may be neglected in this case. Instead, for example, by comparing the first pulse from scanning line 61 and the second pulse from scanning line 62 shown in FIG. 17, or by comparing the second pulse from scanning line 62 and the third pulse from scanning line 63, or by comparing the first pulse from scanning line 61 and the third pulse from scanning line 63, it is possible to obtain extremely distinctive features. That is, by suitably selecting, in accordance with factors such as the scope of the characters to be recognized and the scanning method, the method of extracting the pulses to be compared for timing, the capacity to recognize characters can be further increased, and, moreover, it becomes possible to construct an economical form sensing system.

Furthermore, in the case of comparison of a pulse produced in one scanning line with a pulse produced in another scanning line, since the pulse widths mutually differ, the state of encoding in some case varies depending on the respective points of the pulses selected for mutual comparison, for example, comparison of the pulse rising points or comparison of the pulse falling points. Therefore, by utilizing this characteristic, the method and system for form sensing according to the present invention can be made even more effective.

While in the foregoing disclosure, embodiments of the invention in which phototransistors are used as means to convert form into electrical signals have been described, the invention is not limited to the use of only phototransistors, it being possible to arrange and compose the system apparatus of the invention in a similar manner also by using not only other photoelectric converters but also magnetic means such as magnetic heads.

Accordingly, it should be understood that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. In a form sensing system of the type, wherein a character to be read is scanned along a plurality of scanning lines and converted into electrical pulse signals by means of a plurality of detecting elements provided in correspondence to the respective scanning lines, the improvement which comprises: at least one group of pulse number limiters for permitting passage of a predetermined number of pulses among the respective pulse signals from the detecting elements; a first group of signal analyzing circuits, each of which is for comparing relative positions of last pulses among predetermined two different signals from said pulse number limiters to generate an electrically coded signal; a second group of signal analyzing circuits, each of which is for comparing relative positions of last pulses among predetermined two different signals from said detecting elements to generate another electrically coded signal; and logical operation means for logically operating said two kinds of coded signals from said first and second signal analyzing circuit groups to recognize said character.

2. The form sensing system according to claim 1, wherein said pulse number limiter group is for permitting passage only of first pulses among the respective pulse signals, and said first signal analyzing circuit group is for comparing the relative positions of said first pulses.

3. The form sensing system according to claim 1, wherein said pulse number limiter group is composed of at least two subgroups, one of which is for permitting passage only of first pulses among the respective pulse signals, and the other one is for permitting passage of more than one pulse at the beginning of the respective pulse signals; and said first signal analyzing circuit group is composed of at least two subgroups which are provided in correspondence to said respective subgroups of pulse number limiters.

4. The form sensing system according to claim 1, wherein said first and second signal analyzing circuit groups include means for comparing the relative positions of pulses spaced at an interval greater than a predetermined value.

5. The form sensing system according to claim 1, wherein said first and second signal analyzing circuit groups include means for comparing the relative positions of pulses in the respective two adjoining scanning lines.

6. The form sensing system according to claim 1, wherein said first and second signal analyzing circuit groups include means for comparing the relative positions of pulses in the two scanning lines separated by at least one scanning line interposed therebetween.

7. The form sensing system according to claim 1, wherein said logical operation means comprises plural groups of exclusive OR circuits and pulse counters, each group of said exclusive OR circuits logically operating said electrically coded signals from each of said signal analyzing circuit groups to generate another coded signal indicating the identity of the respective two adjoining pulses among said electrically coded signals, and each group of said pulse counters counting pulses among said other coded signal from each group of said exclusive OR circuits; and said logical operation means further comprising a character recognizing circuit for recognizing said character based upon output signals of said pulse counters.

References Cited

UNITED STATES PATENTS

| | | | |
|---|---|---|---|
| 3,136,976 | 6/1964 | Dietrich | 340—146.3 |
| 3,142,818 | 7/1964 | Holt | 340—146.3 |
| 3,328,761 | 6/1967 | Yamamoto et al. | |

MAYNARD R. WILBUR, *Primary Examiner.*

J. SHERIDAN, *Assistant Examiner.*